(12) United States Patent
Ito et al.

(10) Patent No.: US 7,828,985 B2
(45) Date of Patent: Nov. 9, 2010

(54) METHOD OF PRODUCING THIN FILM MAGNETIC HEAD

(75) Inventors: Yuji Ito, Tokyo (JP); Hiraku Hirabayashi, Tokyo (JP); Yoshiyuki Mizoguchi, Tokyo (JP); Nobuya Oyama, Tokyo (JP)

(73) Assignee: TDK Corporation, Tokyo (JP)

( * ) Notice: Subject to any disclaimer, the term of this patent is extended or adjusted under 35 U.S.C. 154(b) by 608 days.

(21) Appl. No.: 11/892,773

(22) Filed: Aug. 27, 2007

(65) Prior Publication Data

US 2008/0087630 A1  Apr. 17, 2008

(30) Foreign Application Priority Data

Oct. 16, 2006  (JP) .............................. 2006-281715

(51) Int. Cl.
- C23F 1/00    (2006.01)
- B44C 1/22    (2006.01)
- H01L 21/00   (2006.01)
- H01L 21/302  (2006.01)

(52) U.S. Cl. .............................. 216/58; 216/22; 438/3; 438/689

(58) Field of Classification Search ..................... 438/3, 438/57, 689; 216/22, 27, 58; 29/603; 205/119, 205/123; 360/110, 113, 119
See application file for complete search history.

(56) References Cited

U.S. PATENT DOCUMENTS 5,874,010 A * 2/1999 Tao et al. .................... 216/22

6,081,408 A * 6/2000 Partee ......................... 360/317
6,754,947 B2 * 6/2004 Stageberg et al. .......... 29/603.12
2004/0218312 A1 * 11/2004 Matono ....................... 360/317

FOREIGN PATENT DOCUMENTS

| JP | A-6-68424    | 3/1994 |
| JP | A-8-147625   | 6/1996 |
| JP | A-11-167705  | 6/1999 |
| JP | A-2000-231705 | 8/2000 |
| JP | A-2001-526440 | 12/2001 |
| JP | B2 3349925   | 11/2002 |

* cited by examiner

*Primary Examiner*—Binh X Tran
*Assistant Examiner*—Patti Lin
(74) *Attorney, Agent, or Firm*—Oliff & Berridge, PLC

(57) ABSTRACT

A method of producing a thin film magnetic head includes the steps of: forming a second lower magnetic pole layer in a part on a first lower magnetic pole layer; forming, over the entire wafer surface, an insulating layer so as to be thicker than the thickness of the second lower magnetic pole layer in the stacking direction, the insulating layer being less likely to be etched than the second lower magnetic pole layer; carrying out a planarizing process by CMP on the entire wafer surface until the second lower magnetic pole layer is exposed; forming a concave portion including the second lower magnetic pole layer and the insulating layer by ion beam etching on the entire wafer surface; forming a recording gap layer over the entire wafer surface; and forming a first upper magnetic pole layer in the upper magnetic pole layer so as to fill the concave portion.

4 Claims, 14 Drawing Sheets

Fig. 4
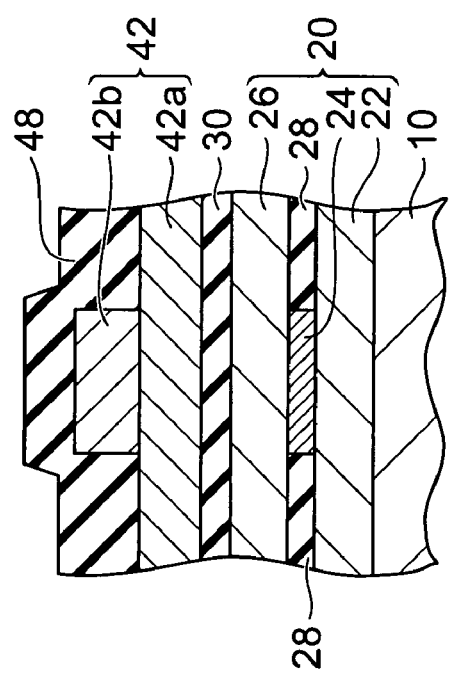
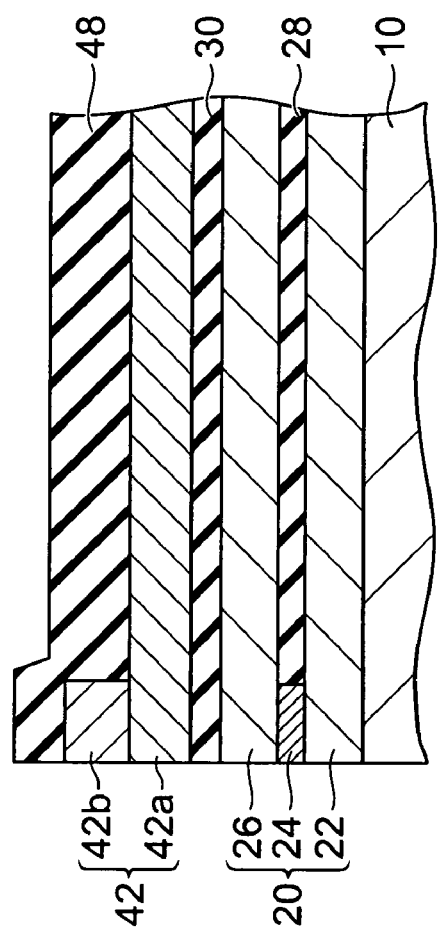

Fig. 8
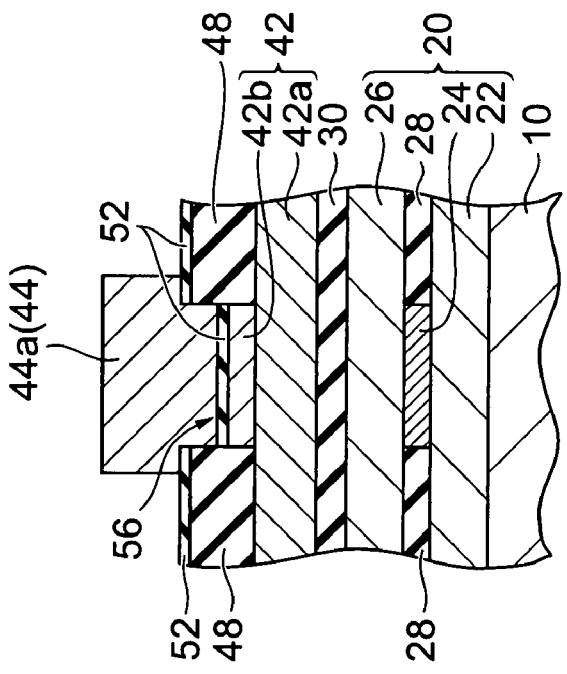
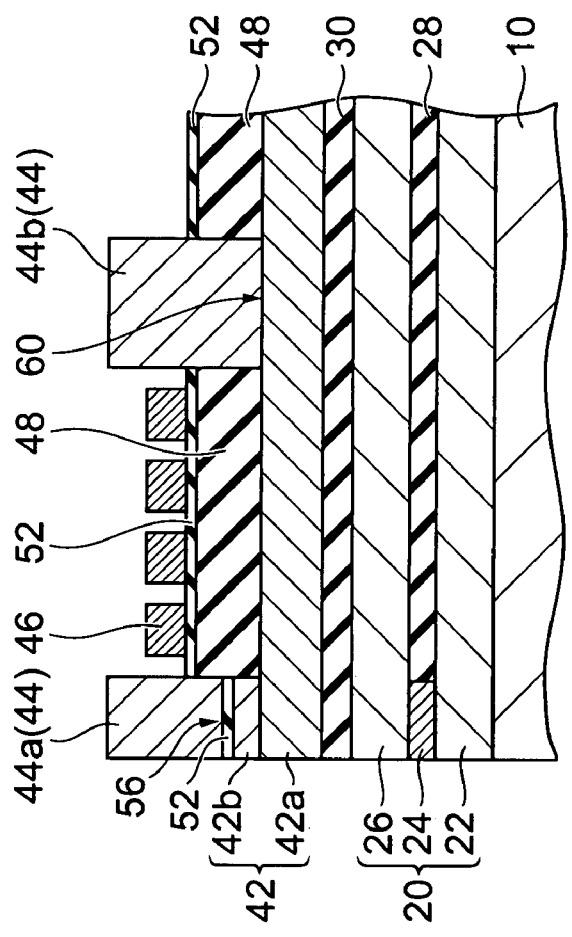

Fig. 9
(a) 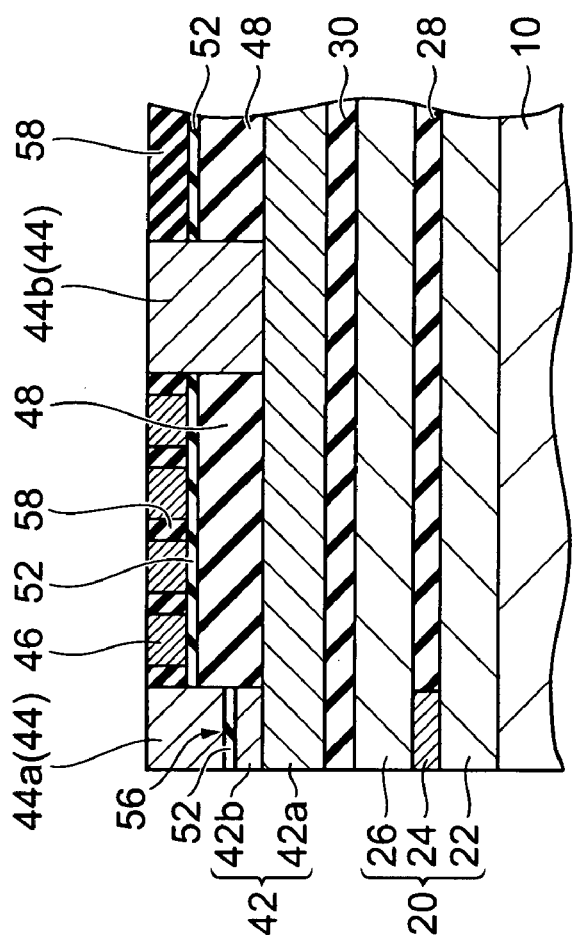
(b) 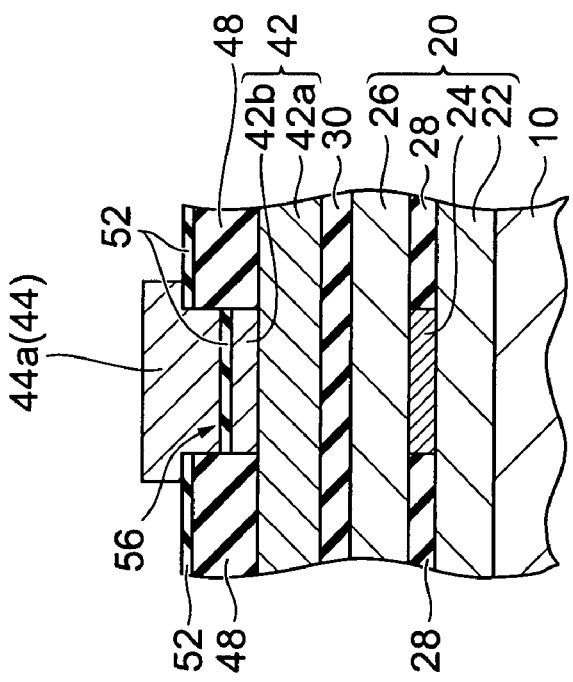

METHOD OF PRODUCING THIN FILM MAGNETIC HEAD

BACKGROUND OF THE INVENTION

1. Field of the Invention

The present invention relates to a method of producing a thin film magnetic head.

2. Related Background of the Invention

There is conventionally known a method of producing a thin film magnetic head, comprising the steps of: forming a lower magnetic pole layer; forming a recording gap layer on the lower magnetic pole layer; forming an upper magnetic pole layer in a part on the recording gap layer; and ion beam etching the lower magnetic pole layer, the recording gap layer, and the upper magnetic pole layer so that the width (hereinafter, referred to as the width of the lower magnetic pole layer) of the lower magnetic pole layer on the medium facing surface in the track width direction may agree with that (hereinafter, referred to as the width of the upper magnetic pole layer) of the upper magnetic pole layer on the medium facing surface in the track width direction (for example, see Japanese Patent No. 3349925).

SUMMARY OF THE INVENTION

In the conventional method of producing a thin film magnetic head described above, the width of the lower magnetic pole layer is matched with that of the upper magnetic pole layer by ion beam etching, thereby suppressing generation of a leakage magnetic field in the outside of an opposing space through which the lower magnetic pole layer and the upper magnetic pole layer face each other. By thus suppressing generation of the leakage magnetic field, the so-called "write fringing" that causes extra data to be recorded between the adjacent tracks is also suppressed.

However, in the case where the recording gap layer is formed of alumina ($Al_2O_3$) or $SiO_2$, it is difficult to match the width of the upper magnetic pole layer with that of the lower magnetic pole layer because the etching rate is different among the recording gap layer, the upper magnetic pole layer, and the lower magnetic pole layer. On the other hand, in the case where the recording gap layer is formed of a material such as ruthenium (Ru) that is easily ion beam etched, it is easy to match the width of the upper magnetic pole layer with that of the lower magnetic pole layer, however the material cost increases, thereby posing a problem of significantly increased manufacturing cost.

The present invention is intended to provide a method of producing a thin film magnetic head capable of suppressing generation of a leakage magnetic field while suppressing the manufacturing cost.

The method of producing a thin film magnetic head concerning the present invention includes the steps of: forming a first lower magnetic pole layer; forming a second lower magnetic pole layer in a part on the first lower magnetic pole layer; forming a nonmagnetic insulating layer on the first and second lower magnetic pole layers, the nonmagnetic insulating layer being less likely to be etched than the second lower magnetic pole layer; removing a part of the nonmagnetic insulating layer until an entire upper surface of the second lower magnetic pole layer in a stacking direction is exposed; forming a concave portion including the second lower magnetic pole layer and the nonmagnetic insulating layer by etching the second lower magnetic pole layer and the nonmagnetic insulating layer until a thickness of the second lower magnetic pole layer is thinner than that of the nonmagnetic insulating layer; forming a recording gap layer so as to cover at least a surface of the second lower magnetic pole layer; and forming a first upper magnetic pole layer so as to fill the concave portion.

In the method of producing a thin film magnetic head concerning the present invention, since the nonmagnetic insulating layer is less likely to be etched than the second lower magnetic pole layer, the concave portion including the second lower magnetic pole layer and the nonmagnetic insulating layer is formed by etching the second lower magnetic pole layer and the nonmagnetic insulating layer until the thickness of the second lower magnetic pole layer is thinner than that of the nonmagnetic insulating layer. Then, after forming the recording gap layer that covers at least the surface of the second lower magnetic pole layer, the first upper magnetic pole layer is formed so as to fill the concave portion. For this reason, even if the etching rate is different between the recording gap layer and the first upper magnetic pole layer, it is possible to match the width of the upper magnetic pole layer with that of the concave portion on a medium facing surface in the track width direction, i.e., the width of the second lower magnetic pole layer on the medium facing surface in the track width direction (hereinafter, referred to as the width of the second lower magnetic pole layer). As a result, since it is not necessary to use an expensive material such as Ru, the manufacturing cost can be suppressed, and also the width of the second lower magnetic pole layer can be matched with that of the first upper magnetic pole layer, thereby enabling to suppress generation of a leakage flux.

Moreover, it is preferable to further include the steps of: removing a portion that sticks out of the concave portion in the first upper magnetic pole layer after the step of forming the first upper magnetic pole layer; and forming a second upper magnetic pole layer that is connected to the first upper magnetic pole layer.

Moreover, it is preferable that in the step of forming the second upper magnetic pole layer, the second upper magnetic pole layer be arranged at a position where the second upper magnetic pole layer is not exposed from the medium facing surface that faces a recording medium. Since this makes the distance between the second upper magnetic pole layer and the recording medium larger than the distance between the first upper magnetic pole layer and the recording medium, even if a leakage flux occurs between the second upper magnetic pole layer and the first or second lower magnetic pole layer, the influence by this leakage flux can be suppressed.

Moreover, it is preferable that the width of the second upper magnetic pole layer in the track width direction be smaller than that of the first upper magnetic pole layer in the track width direction. This enables to further suppress generation of a leakage flux between the second upper magnetic pole layer and the first or second lower magnetic pole layer.

According to the present invention, it is possible to provide a method of producing a thin film magnetic head capable of suppressing generation of a leakage magnetic field while suppressing the manufacturing cost.

The present invention will be more fully understood from the detailed description given here in below and the accompanying drawings which are given by way of illustration only, and thus are not to be considered as limiting the present invention.

Figure 2:
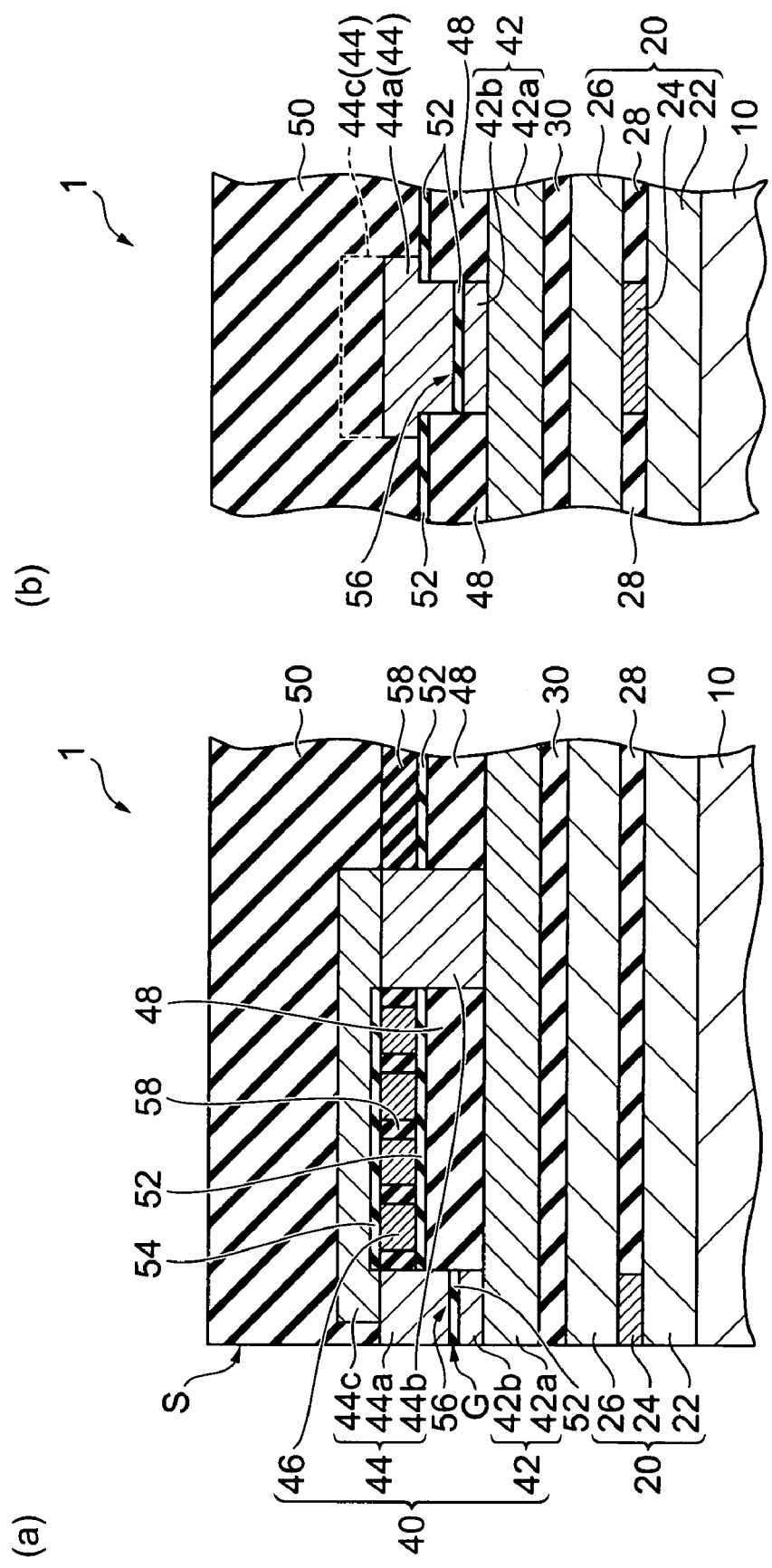
Figure 3:
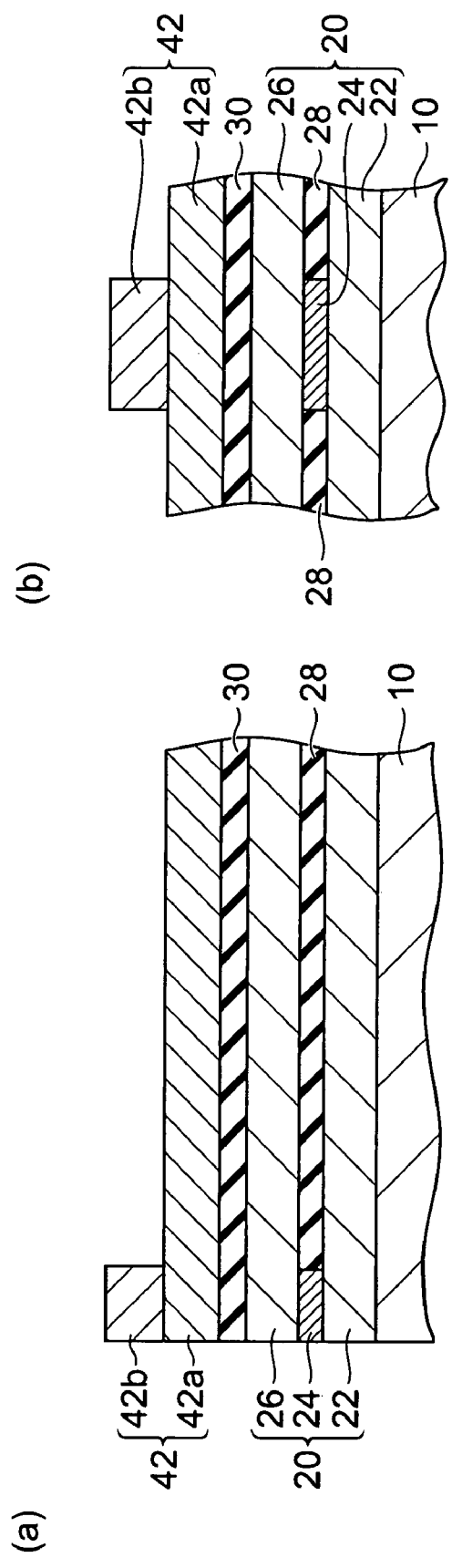
Figure 5:
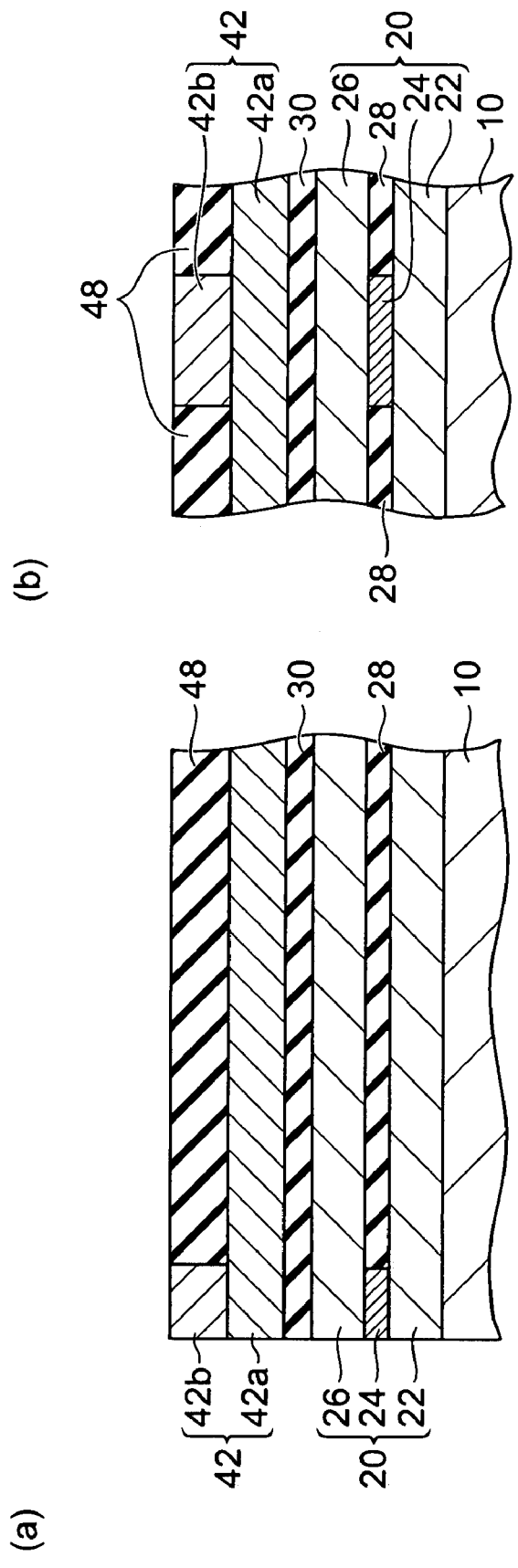
Figure 6:
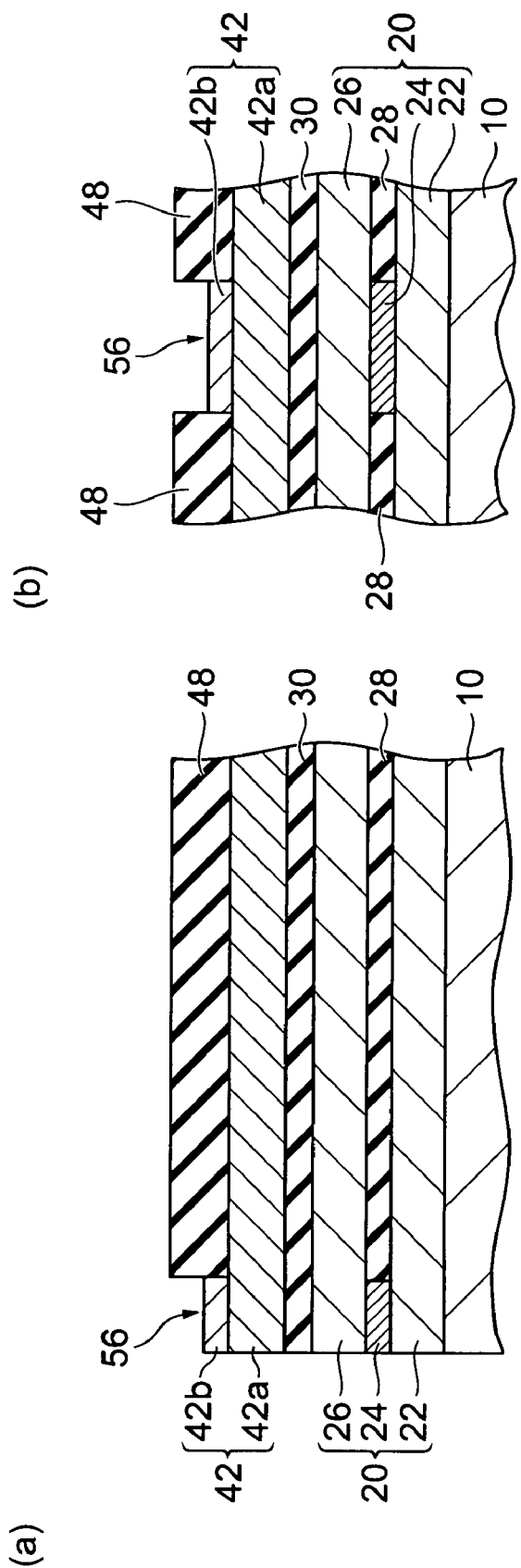
Figure 7:
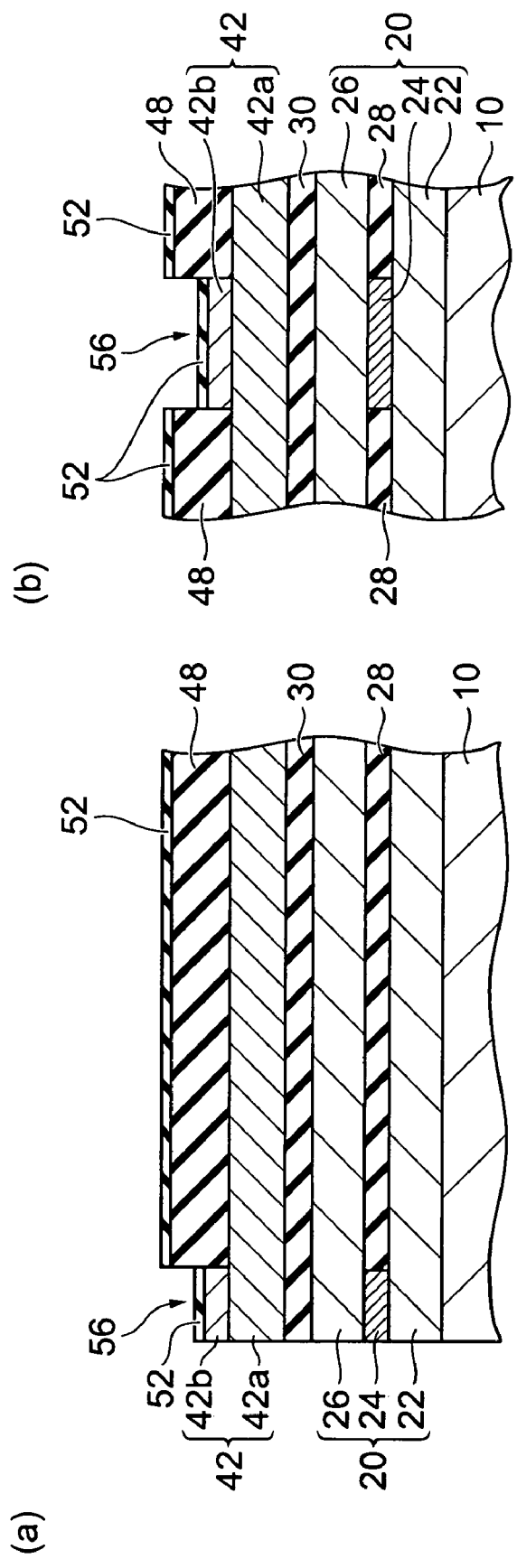
Figure 10:
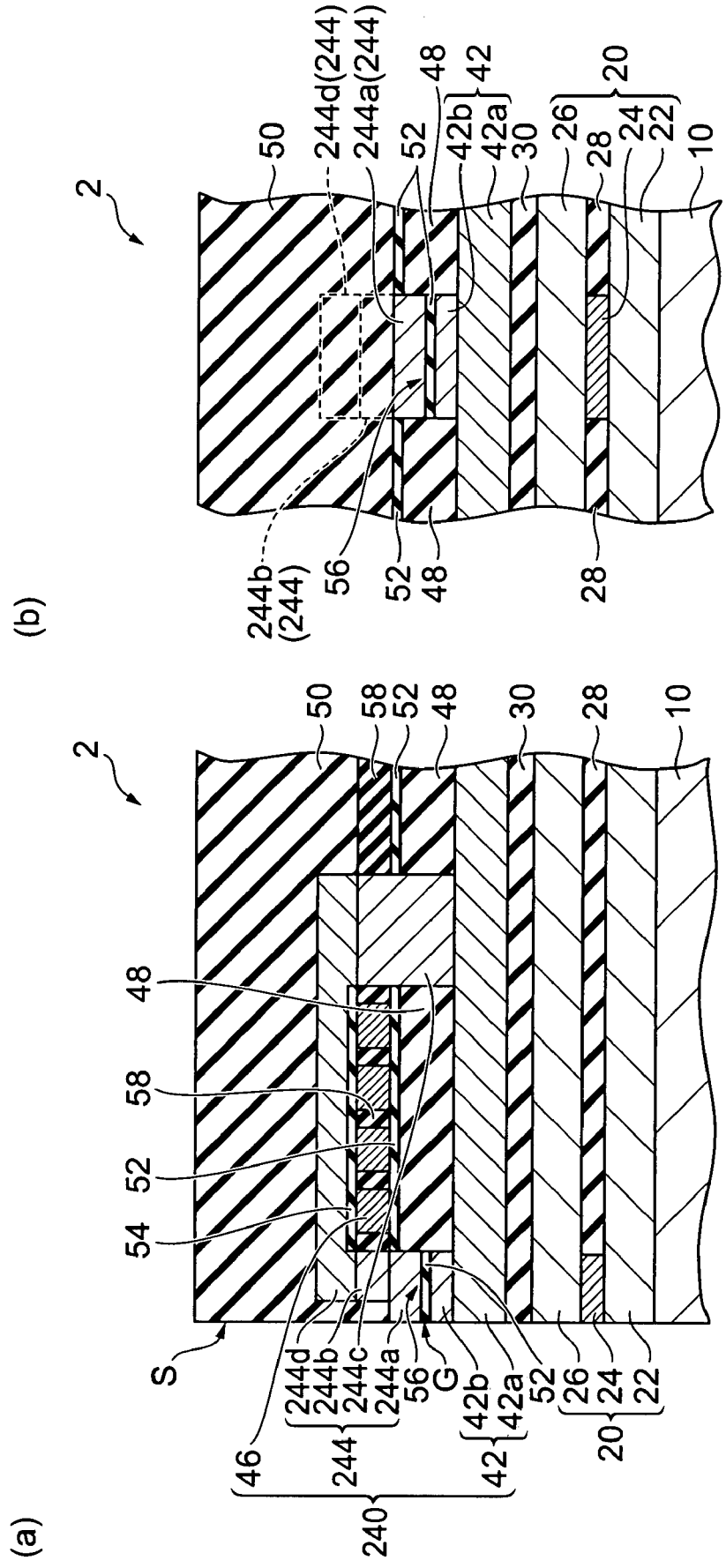
Figure 11:
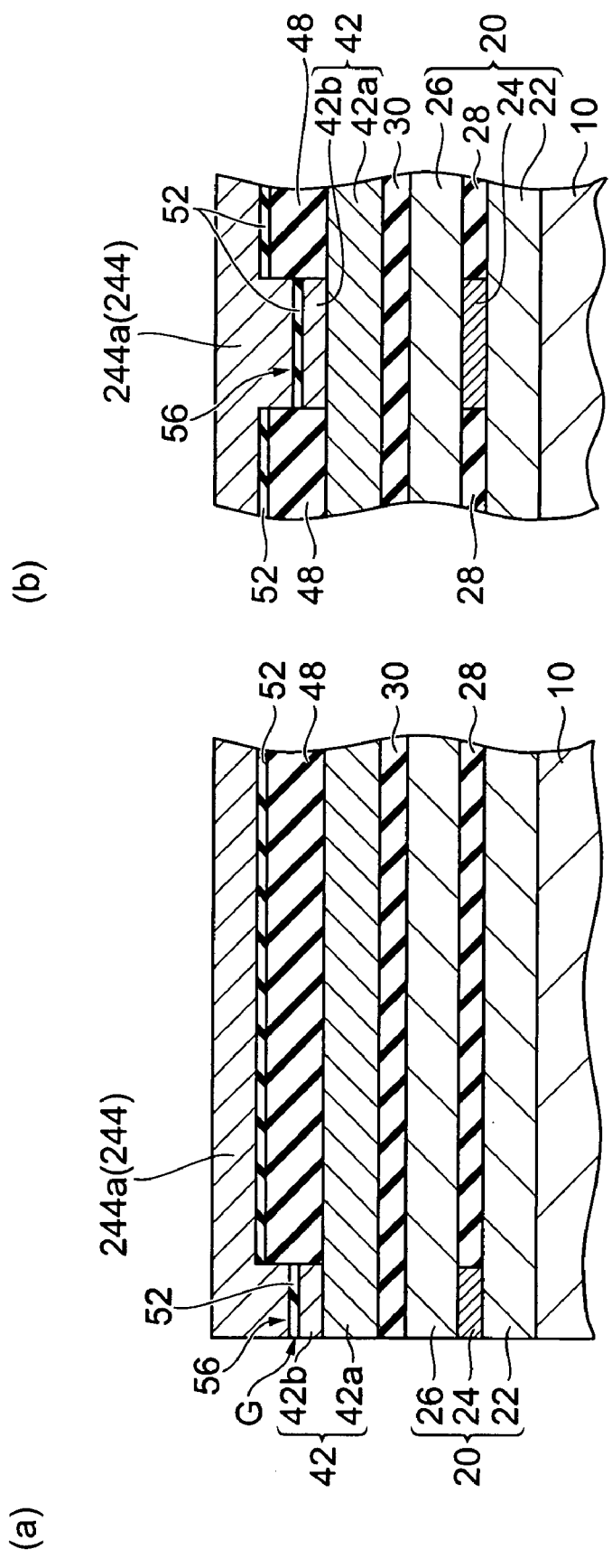
Figure 12:
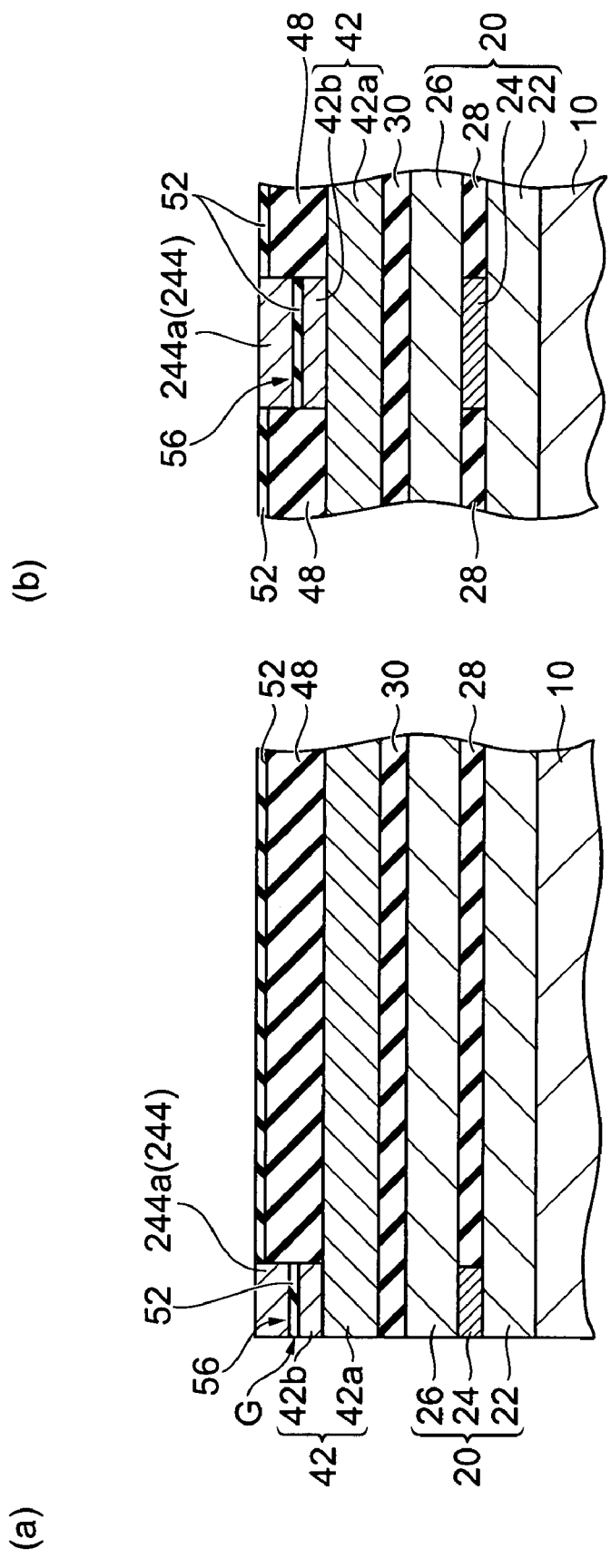
Figure 13:
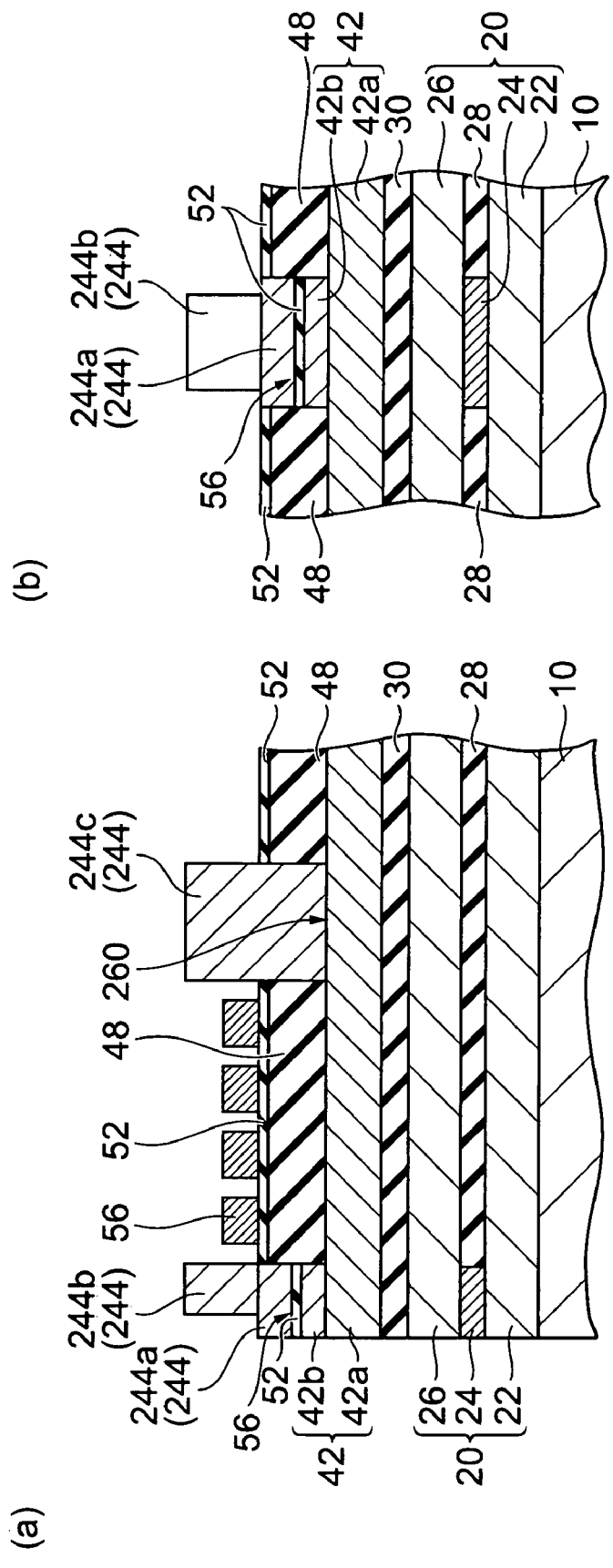
Figure 14:
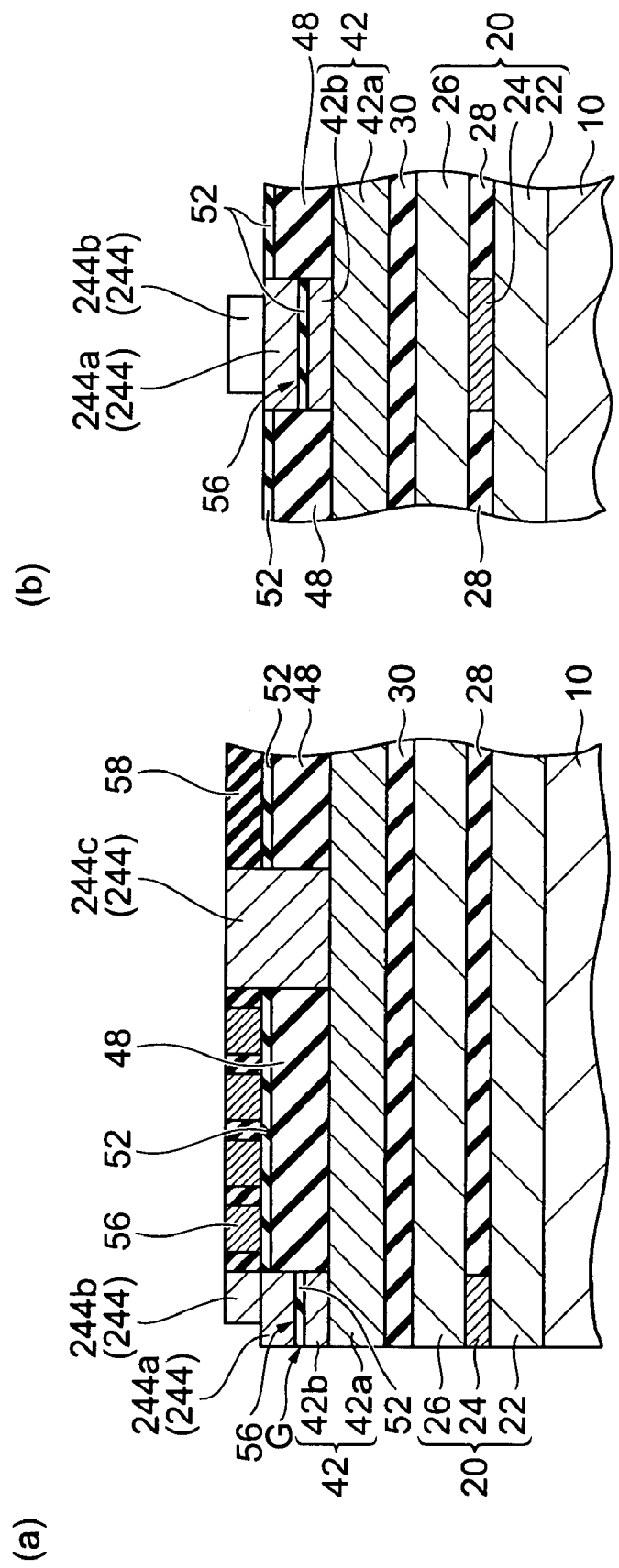

(a) of FIG. 2 is a schematic cross sectional view of the thin film magnetic head concerning the first embodiment, which is perpendicular to a medium facing surface and seen from the track width direction, and (b) of FIG. 2 is a schematic cross sectional view of the thin film magnetic head concerning the first embodiment as seen from the medium facing surface;

FIG. 3 is a view showing a step of producing a recording head part constituting the thin film magnetic head concerning the first embodiment;

FIG. 4 is a view showing a subsequent step of FIG. 3;
FIG. 5 is a view showing a subsequent step of FIG. 4;
FIG. 6 is a view showing a subsequent step of FIG. 5;
FIG. 7 is a view showing a subsequent step of FIG. 6;
FIG. 8 is a view showing a subsequent step of FIG. 7;
FIG. 9 is a view showing a subsequent step of FIG. 8;

(a) of FIG. 10 is a schematic cross sectional view of a thin film magnetic head concerning a second embodiment, which is perpendicular to the medium facing surface and seen from the track width direction, and (b) of FIG. 10 is a schematic cross sectional view of the thin film magnetic head concerning the second embodiment as seen from the medium facing surface;

FIG. 11 is a view showing a step of producing a recording head part constituting the thin film magnetic head concerning the second embodiment;

FIG. 12 is a view showing a subsequent step of FIG. 11;
FIG. 13 is a view showing a subsequent step of FIG. 12; and,
FIG. 14 is a view showing a subsequent step of FIG. 13.

DESCRIPTION OF THE PREFERRED EMBODIMENTS

Preferred embodiments of the present invention will be described with reference to the accompanying drawings. Incidentally, in the description, the same numerals are used for the same elements and the elements having the same functions to omit the duplicating description. Moreover, although a term "above" may be used in the description, this corresponds to the upper direction in the view.

First Embodiment

Figure 1:
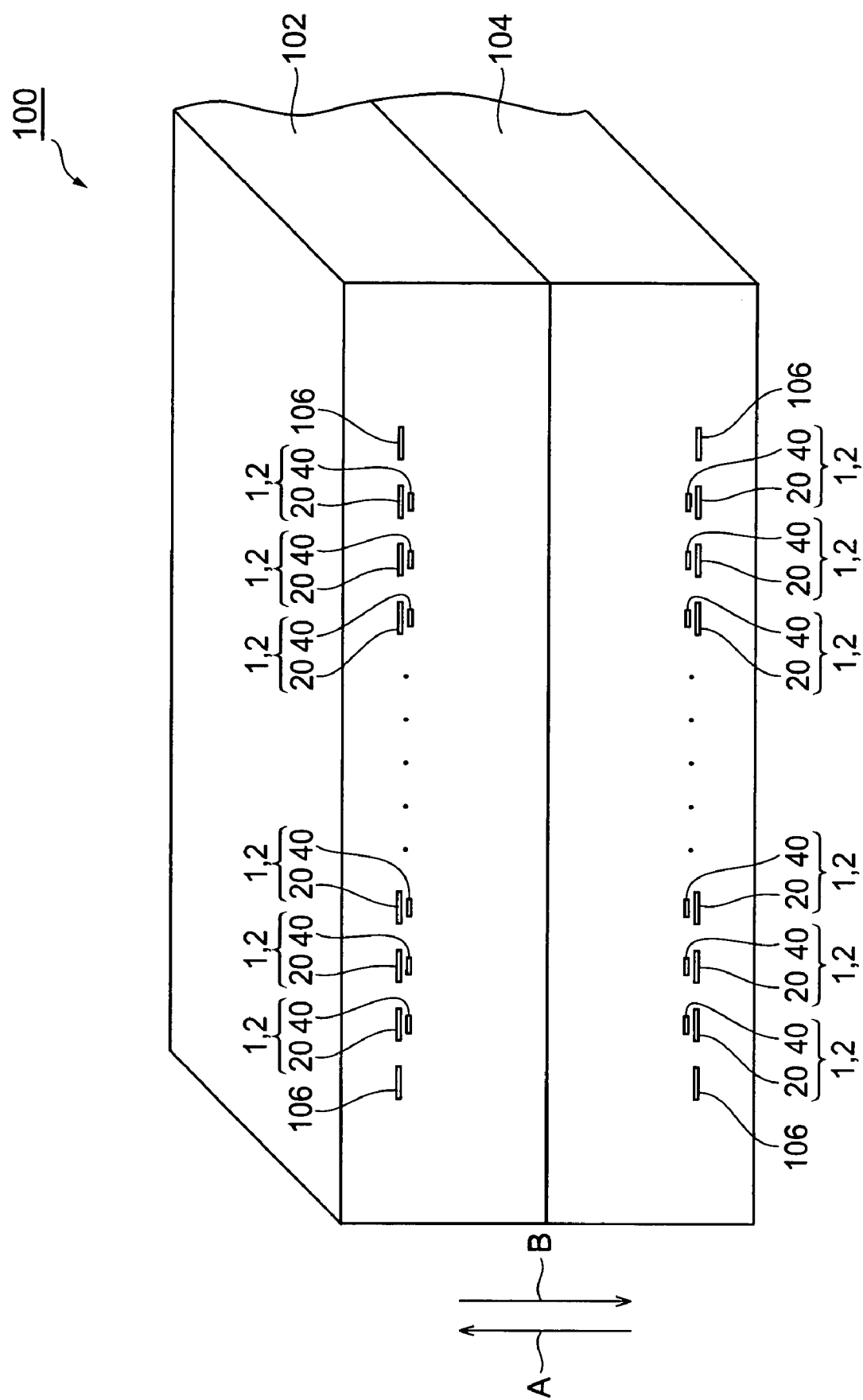
FIG. 1 is a perspective view showing a magnetic head device in which a plurality of thin film magnetic heads concerning a first or second embodiment is mounted.

First, the structure of a magnetic head device 100 provided with a thin film magnetic head 1 concerning a first embodiment is described with reference to FIG. 1. FIG. 1 is a perspective view showing a magnetic head device in which a plurality of thin film magnetic heads concerning the first or second embodiment is mounted.

The magnetic head device 100 is applied to a data storage system of the so-called linear magnetic tape drive method, in which the recording and reading of magnetic information are carried out linearly along the longitudinal direction (running direction of a magnetic tape (see the arrows A and B in FIG. 1)) of the magnetic tape which is a recording medium. The magnetic head device 100 includes a pair of magnetic head stack parts 102, 104 as shown in FIG. 1.

A plurality of thin film magnetic heads 1 having a reading head part 20 and a recording head part 40 (the detail will be described later) and a pair of servo signal reading elements 106 are mounted in each of the magnetic head stack parts 102, 104, respectively. Each thin film magnetic head 1 and each servo signal reading element 106 are disposed so as to be in one row in the magnetic head stack parts 102, 104, respectively, wherein each thin film magnetic head 1 is positioned between a pair of servo signal reading elements 106. Each thin film magnetic head 1 mounted in the magnetic head stack part 102 and each thin film magnetic head 1 mounted in the magnetic head stack part 104 are aligned in the running direction of a magnetic tape, respectively, and a plurality of thin film magnetic head pairs is formed by the corresponding thin film magnetic heads 1.

In the magnetic head stack part 102, the reading head part 20 of the thin film magnetic head 1 is positioned apart from the magnetic head stack part 104 than the recording head part 40. In the magnetic head stack part 104, the reading head part 20 of the thin film magnetic head 1 is positioned apart from the magnetic head stack part 102 than the recording head part 40. When the running direction of a magnetic tape is the direction of the arrow A in FIG. 1, the recording of magnetic information is carried out by the recording head part 40 of the thin film magnetic head 1 mounted in the magnetic head stack part 104 among the thin film magnetic head pairs, and the reading of magnetic information is carried out by the reading head part 20 of the thin film magnetic head 1 mounted in the magnetic head stack part 102 among the thin film magnetic head pairs. On the other hand, when the running direction of the magnetic tape is the direction of the arrow B in FIG. 1, the recording of magnetic information is carried out by the recording head part 40 of the thin film magnetic head 1 mounted in the magnetic head stack part 102 among the thin film magnetic head pairs, and the reading of magnetic information is carried out by the reading head part 20 of the thin film magnetic head 1 mounted in the magnetic head stack part 104 among the thin film magnetic head pairs.

(Structure of a Thin Film Magnetic Head)

Then, with reference to FIG. 2, the structure of the thin film magnetic head 1 concerning the first embodiment is described. (a) of FIG. 2 is a schematic cross sectional view of the thin film magnetic head concerning the first embodiment, which is perpendicular to the medium facing surface and seen from the track width direction, and (b) of FIG. 2 is a schematic cross sectional view of the thin film magnetic head concerning the first embodiment as seen from the medium facing surface.

The thin film magnetic head 1 is provided on top of the substrate 10. The thin film magnetic head 1 serves as a composite type thin film magnetic head, wherein the reading head part 20 having an MR (Magneto Resistive) element 24 to be described later, an insulating layer 30, and the recording head part 40 as an induction type electromagnetic transducer for writing are sequentially stacked on the substrate 10. In the thin film magnetic head 1, the end face on the left side in (a) of FIG. 2 is a medium facing surface S that faces the recording plane of a non-illustrated magnetic tape. The substrate 10 has such a structure that an underlayer made of a nonmagnetic inorganic insulating material such as $Al_2O_3$ having electric insulation is formed with the thickness of about 0.3 µm to 5.0 µm on a wafer made of AlTiC ($Al_2O_3$.TiC).

In the reading head part 20, a lower magnetic shield layer 22 serving also as a lower electrode, an MR element 24, and an upper magnetic shield layer 26 serving also as an upper electrode are stacked on the substrate 10 in this order. Moreover, on both sides of the MR element 24 in the track width direction, a pair of bias application layers (not shown) made of a hard magnetic material is formed via an insulating layer 28.

The lower magnetic shield layer 22 and the upper magnetic shield layer 26 are made of a soft magnetic material such as NiFe (permalloy) and prevent the MR element 24 from sensing an unnecessary external magnetic field. The MR element 24 has a multilayer structure including a free layer (not shown) and is arranged on the medium facing surface S side so as to be exposed to the medium facing surface S.

The MR element 24 detects a change in the magnetic field input from a magnetic tape by using a magnetoresistance effect and reads the magnetic information recorded on the magnetic tape. In addition, a GMR (Giant Magneto Resistive) element using a giant magneto resistance effect of a high magneto-resistance change rate, an AMR (Anisotropy Magneto Resistive) element using an anisotropy magneto resistance effect, a TMR (Tunnel Magneto Resistive) element using a magnetoresistance effect produced at a tunnel junction, a CPP (Current Perpendicular to Plane)-GMR element, or the like may be used in place of the MR element 24.

The insulating layer 28 is made of a nonmagnetic inorganic insulating material, such as $Al_2O_3$ or $SiO_2$, and prevents a current flowing into the free layer included in the MR element 24 from leaking into the bias application layer.

The insulating layer 30 is made of a nonmagnetic inorganic insulating material, such as $Al_2O_3$ or $SiO_2$, and is arranged so as to be sandwiched by the reading head part 20 and the recording head part 40. The thickness of the insulating layer 30 in the stacking direction may be set to between about 0.1 μm and 2.0 μm, for example.

The recording head part 40 includes a lower magnetic pole layer 42 and an upper magnetic pole layer 44 in this order from the substrate 10, and further includes a thin film coil 46. Between the lower magnetic pole layer 42 and the upper magnetic pole layer 44, and above the thin film coil 46 and also above the upper magnetic pole layer 44, there are formed insulating layers 48, 50 made of a nonmagnetic inorganic insulating material, such as $Al_2O_3$ or $SiO_2$, respectively.

The lower magnetic pole layer 42 is made of a soft magnetic material, such as NiFe, CoFe, CoFeNi, or FeN. For this reason, the lower magnetic pole layer 42 is more likely to be etched by ion beam etching, RIE, chemical etching using acid, or the like, than the insulating layer 48. The lower magnetic pole layer 42 includes a first lower magnetic pole layer 42a and a second lower magnetic pole layer 42b. The first lower magnetic pole layer 42a is formed over the entire upper surface of the insulating layer 30. The second lower magnetic pole layer 42b is formed in a part on the first lower magnetic pole layer 42a. For this reason, the second lower magnetic pole layer 42b and the first lower magnetic pole layer 42a are magnetically coupled to each other. The second lower magnetic pole layer 42b includes a constant width portion (not shown) and a variable width portion (not shown). The width of the constant width portion in the track width direction is constant, and one end thereof is exposed to the medium facing surface S and the other end is integrally connected to the variable width portion. The width of the variable width portion in the track width direction increases as departing from the medium facing surface S.

The upper magnetic pole layer 44 is made of a soft magnetic material, such as NiFe, CoFe, CoFeNi, or FeN, as same as the lower magnetic pole layer 42. The upper magnetic pole layer 44 includes a first upper magnetic pole layer 44a, a second upper magnetic pole layer 44b, and a third upper magnetic pole layer 44c. The first upper magnetic pole layer 44a is formed at a position, where the first upper magnetic pole layer 44a faces the second lower magnetic pole layer 42b and a part of the insulating layer 48 while interposing a recording gap layer 52 made of a nonmagnetic inorganic insulating material, such as $Al_2O_3$ or $SiO_2$, therebetween on the medium facing surface S side, and one end thereof is exposed to the medium facing surface S. For this reason, a recording gap G is formed by the recording gap layer 52 that is sandwiched by the second lower magnetic pole layer 42b and the first upper magnetic pole layer 44a. The first upper magnetic pole layer 44a is formed so as to fill a concave portion 56 comprised of the second lower magnetic pole layer 42b and insulating layer 48. For this reason, the width (hereinafter, referred to as the width of the first upper magnetic pole layer 44a) of a portion at the recording gap 52 side in the first upper magnetic pole layer 44a on the medium facing surface S in the track width direction is equal to that (hereinafter, referred to as the width of the second lower magnetic pole layer 42b) of the second lower magnetic pole layer 42b on the medium facing surface S in the track width direction. The first upper magnetic pole layer 44a includes a constant width portion (not shown), the width of which in the track width direction is constant, and a variable width portion (not shown), the width of which in the track width direction increases as departing from the medium facing surface S, as same as the second lower magnetic pole layer 42b.

The second upper magnetic pole layer 44b is formed so as to be positioned on the side apart from the medium facing surface S and is connected to the first lower magnetic pole layer 42a. For this reason, the second upper magnetic pole layer 44b and the first lower magnetic pole layer 42a are magnetically coupled to each other. The third upper magnetic pole layer 44c is formed on top of the first upper magnetic pole layer 44a and the second upper magnetic pole layer 44b and is connected to the first upper magnetic pole layer 44a and the second upper magnetic pole layer 44b, respectively. For this reason, the third upper magnetic pole layer 44c, the first upper magnetic pole layer 44a, and the second upper magnetic pole layer 44b are magnetically coupled to one another. Accordingly, the upper magnetic pole layer 44 and the lower magnetic pole layer 42 form a magnetic circuit across the recording gap G.

The thin film coil 46 generates a magnetic field in the vicinity of the recording gap G by electromagnetic induction and stores magnetic information on a magnetic tape. The thin film coils 46 are formed in such a spiral shape that a conductive wire is wound at the end portion on the side far from the medium facing surface S in the upper magnetic pole layer 44, i.e., around the second upper magnetic pole layer 44b, respectively. The thin film coil 46 is positioned between the recording gap layer 52 on the insulating layer 48 and an insulating layer 54 made of a nonmagnetic inorganic insulating material, such as $Al_2O_3$ or $SiO_2$. Between the adjacent conductive wires among the conductive wires constituting the thin film coil 46, a resist film 58 that is an organic insulating material is interposed.

(Method of Producing a Recording Head Part)

Next, a method of producing the recording head part 40 constituting the thin film magnetic head 1 will be described with reference to FIG. 2 to FIG. 9. FIG. 3 is a view showing a step of producing the recording head part constituting the thin film magnetic head concerning the first embodiment. FIG. 4 is a view showing a subsequent step of FIG. 3. FIG. 5 is a view showing a subsequent step of FIG. 4. FIG. 6 is a view showing a subsequent step of FIG. 5. FIG. 7 is a view showing a subsequent step of FIG. 6. FIG. 8 is a view showing a subsequent step of FIG. 7. FIG. 9 is a view showing a subsequent step of FIG. 8. Incidentally, each view illustrates only one element, but actually a plurality of thin film magnetic heads 1 is produced from one wafer.

First, as shown in FIG. 3, an underlayer made of an insulating material is formed on a wafer made of AlTiC to form the substrate 10. Then, the reading head part 20, the insulating layer 30, and the first lower magnetic pole layer 42a are sequentially stacked on the substrate 10. The insulating layer 30 can be formed by sputtering, for example, and the first lower magnetic pole layer 42a can be formed by sputtering or by plating, for example. Then, the second lower magnetic pole layer 42b is formed in a part on the medium facing surface S side on the first lower magnetic pole layer 42a by frame plating, for example. Here, the thickness of the second lower magnetic pole layer 42b in the stacking direction can be set to between about 0.3 μm and 3.0 μm, for example. Moreover, the width of the second lower magnetic pole layer 42b can be set to between about 1.0 μm and 20.0 μm, for example.

Then, as shown in FIG. 4, the insulating layer 48 is formed over the entire wafer surface by sputtering, for example. Here, the thickness of the insulating layer 48 in the stacking direction is made thicker than that of the second lower magnetic pole layer 42b in the stacking direction, and can be set to between about 0.3 μm and 4.0 μm, for example. Accordingly, the second lower magnetic pole layer 42b is completely covered with the insulating layer 48. Then, as shown in FIG. 5, a planarizing process is carried out to the entire wafer surface by chemical mechanical polishing (CMP) or the like until the second lower magnetic pole layer 42b is exposed.

Then, the entire wafer surface is subjected to etching. At this time, the insulating layer 48 is less likely to be etched than the second lower magnetic pole layer 42b, so that the thickness of the second lower magnetic pole layer 42b in the stacking direction is smaller than that of the insulating layer 48 in the stacking direction by etching. As a result, as shown in FIG. 6, the concave portion 56 comprised of the second lower magnetic pole layer 42b and the insulating layer 48 is formed. At this time, the etching can be performed until the thickness of the second lower magnetic pole layer 42b in the stacking direction is between about 0.1 μm and 1.0 μm, and the etching can be performed until the thickness of the insulating layer 48 in the stacking direction is between about 0.3 μm and 2.9 μm. Then, as shown in FIG. 7, the recording gap layer 52 is deposited over the entire wafer surface. The recording gap layer 52 can be formed using a nonmagnetic inorganic insulating material such as $Al_2O_3$ by sputtering, for example. The thickness of the recording gap layer 52 in the stacking direction can be set to between about 0.1 μm and 1.0 μm, for example.

Then, the next step is described with reference to FIG. 8. A place where the second upper magnetic pole layer 44b is to be formed in the subsequent step is partially etched to form an opening 60. Then, the first upper magnetic pole layer 44a of the upper magnetic pole layer 44 is formed so as to fill the concave portion 56 and also the second upper magnetic pole layer 44b is formed so as to fill the opening 60. The first upper magnetic pole layer 44a and the second upper magnetic pole layer 44b are formed by frame plating, for example. Then, the thin film coil 46 is formed on the recording gap layer 52. The thin film coil 46 can be formed using a conductor such as Cu by frame plating, for example.

Then, the next step is described with reference to FIG. 9. First, resin such as photoresist is uniformly applied over the entire wafer surface to form a non-illustrated resin film and then a predetermined portion in the resin film is exposed. Then, by carrying out development and heating (curing) of the resin film, a resist film 58 is formed between the adjacent conductive wires among the conductive wires constituting the thin film coil 46 as well as in the upper surface of the conductive wires constituting the thin film coil 46. Then, a planarizing process by CMP is carried out to the entire wafer surface until the thin film coil 46 is exposed.

Then, as shown in FIG. 2, the insulating layer 54 is partially formed by sputtering so as to cover the upper surface of the thin film coil 46. Then, the third upper magnetic pole layer 44c of the upper magnetic pole layer 44 is formed by frame plating, for example. At this time, the third upper magnetic pole layer 44c is formed so as to connect the first upper magnetic pole layer 44a with the second upper magnetic pole layer 44b. Then, the insulating layer 50 is deposited by sputtering so as to cover the entire wafer surface. Then, the surface of the insulating layer 50 is planarized by CMP. Thus, the thin film magnetic head 1 shown in FIG. 2 along with the recording head part 40 is obtained.

As described above, in the first embodiment, since the insulating layer 48 is less likely to be etched than the second lower magnetic pole layer 42b, the concave portion 56 comprised of the second lower magnetic pole layer 42b and the insulating layer 48 is formed by etching the second lower magnetic pole layer 42b and the insulating layer 48. Then, after forming the recording gap layer 52 over the entire wafer surface, the first upper magnetic pole layer 44a is formed so as to fill the concave portion 56. For this reason, even if the etching rates of the recording gap layer 52 and first upper magnetic pole layer 44a are different, the width of the first upper magnetic pole layer 44a can be matched with that of the second lower magnetic pole layer 42b. As a result, since it is not necessary to use an expensive material such as Ru, the manufacturing cost can be suppressed, and also the width of the second lower magnetic pole layer 42b is matched with that of the first upper magnetic pole layer 44a, thereby enabling to suppress generation of a leakage flux.

Second Embodiment (Structure of a Thin Film Magnetic Head)

Then, with reference to FIG. 10, the structure of a thin film magnetic head 1 concerning a second embodiment will be described. (a) of FIG. 10 is a schematic cross sectional view of a thin film magnetic head concerning a second embodiment, which is perpendicular to the medium facing surface and seen from the track width, and (b) of FIG. 10 is a schematic cross sectional view of the thin film magnetic head concerning the second embodiment as seen from the medium facing surface.

The thin film magnetic head 1 serves as a composite type thin film magnetic head in which the reading head part 20, the insulating layer 30, and a recording head part 240 are sequentially stacked on the substrate 10.

The recording head part 240 includes the lower magnetic pole layer 42 and an upper magnetic pole layer 244 in this order from the substrate 10, and further includes the thin film coil 46.

The upper magnetic pole layer 244 is made of a soft magnetic material, such as NiFe, CoFe, CoFeNi, or FeN, as same as the lower magnetic pole layer 42. The upper magnetic pole layer 244 includes a first upper magnetic pole layer 244a, a second upper magnetic pole layer 244b, a third upper magnetic pole layer 244c, and a fourth upper magnetic pole layer 244d. The first upper magnetic pole layer 244a is formed at a position, where the first upper magnetic pole layer 244a faces the second lower magnetic pole layer 42b while interposing the recording gap layer 52 therebetween on the medium facing surface S side, and one end thereof is exposed to the medium facing surface S. For this reason, the recording gap G is formed by the recording gap layer 52 that is sandwiched by the second lower magnetic pole layer 42b and the first upper magnetic pole layer 244a. The first upper magnetic pole layer 244a is formed so as to fill the concave portion 56 comprised of the second lower magnetic pole layer 42b and the insulating layer 48. For this reason, the width (hereinafter, referred to as the width of the first upper magnetic pole layer 244a) of a portion at the recording gap layer 52 side of the first upper magnetic pole layer 244a on the medium facing surface S in the track width direction is equal to that of the second lower magnetic pole layer 42b.

The second upper magnetic pole layer 244b is formed on the first upper magnetic pole layer 244a. For this reason, the second upper magnetic pole layer 244b and the first upper magnetic pole layer 244a are magnetically coupled to each other. The second upper magnetic pole layer 244b is arranged apart from the medium facing surface S so as not to be exposed to the medium facing surface S. The width (hereinafter, referred to as the width of the second upper magnetic pole layer 244b) of the second upper magnetic pole layer 244b on the medium facing surface S side in the direction parallel to the medium facing surface S and perpendicular to the stacking direction is made smaller than that of the second lower magnetic pole layer 42b and the width of the first upper magnetic pole layer 244a.

The third upper magnetic pole layer 244c is formed so as to be positioned on the side apart from the medium facing surface S and is connected to the first lower magnetic pole layer 42a. For this reason, the third upper magnetic pole layer 244c and the first lower magnetic pole layer 42a are magnetically coupled to each other. The fourth upper magnetic pole layer 244d is formed on top of the second upper magnetic pole layer 244b and the third upper magnetic pole layer 244c and is connected to the second upper magnetic pole layer 244b and the third upper magnetic pole layer 244c, respectively. For this reason, the fourth upper magnetic pole layer 244d, the second upper magnetic pole layer 244b, and the third upper magnetic pole layer 244c are magnetically coupled to one another. Accordingly, the upper magnetic pole layer 244 and the lower magnetic pole layer 42 form a magnetic circuit across the recording gap G.

(Method of Producing a Recording Head Part)

Then, a method of producing the recording head part 240 constituting a thin film magnetic head 2 will be described with reference to FIG. 10 to FIG. 14. FIG. 11 is a view showing a step of producing the recording head part constituting the thin film magnetic head concerning the second embodiment. FIG. 12 is a view showing a subsequent step of FIG. 11. FIG. 13 is a view showing a subsequent step of FIG. 12. FIG. 14 is a view showing a subsequent step of FIG. 13. Incidentally, since the steps until the recording gap layer 52 is formed are the same as those of the method of producing the thin film magnetic head 1 concerning the first embodiment, the description thereof is omitted.

After forming the recording gap layer 52, the first upper magnetic pole layer 244a is formed over the entire wafer surface as shown in FIG. 11 so as to fill the concave portion 56. Then, as shown in FIG. 12, a planarizing process by CMP is carried out to the entire wafer surface until the recording gap layer 52 on the insulating layer 48 is exposed, thereby removing a portion that sticks out of the concave portion 56 in the first upper magnetic pole layer 244a.

Then, the next step is described with reference to FIG. 13. First, a place where the third upper magnetic pole layer 244c is to be formed in the subsequent step is partially etched to form an opening 260. Then, the second upper magnetic pole layer 244b is formed at a position, which is a part on the first upper magnetic pole layer 244a and is not exposed to the medium facing surface S, and also the third upper magnetic pole layer 244c is formed so as to fill the opening 60. The second upper magnetic pole layer 244b and the third upper magnetic pole layer 244c are formed by frame plating, for example. Then, the thin film coil 46 is formed on the record-ing gap layer 52. The thin film coil 46 can be formed using a conductive wire made of Cu or the like by frame plating, for example.

Then, the next step is described with reference to FIG. 14. First, resin such as photoresist is uniformly applied over the entire wafer surface to form a non-illustrated resin film, and then a predetermined portion in the resin film is exposed. Then, by carrying out development and heating (curing) of the resin film, the resist film 58 is formed between the adjacent conductive wires among the conductive wires constituting the thin film coil 46, as well as in the upper surface of the conductive wires constituting the thin film coil 46. Then, a planarizing process by CMP is carried out to the entire wafer surface until the thin film coil 46 is exposed.

Then, as shown in FIG. 10, the insulating layer 54 is partially formed by sputtering so as to cover the upper surface of the thin film coil 46. Then, the fourth upper magnetic pole layer 244d of the upper magnetic pole layer 244 is formed by frame plating, for example. At this time, the fourth upper magnetic pole layer 244d is formed so as to connect the second upper magnetic pole layer 244b with the third upper magnetic pole layer 244c. Then, the insulating layer 50 is deposited by sputtering so as to cover the entire wafer surface. Then, the surface of the insulating layer 50 is planarized by CMP. Thus, the thin film magnetic head 2 shown in FIG. 10 along with the recording head part 240 is obtained.

The thin film magnetic head 2 as described above concerning the second embodiment achieves the same operation effect as that of the thin film magnetic head 1 concerning the first embodiment.

Moreover, in the second embodiment, the second upper magnetic pole layer 244b is arranged apart from the medium facing surface S so as not to be exposed to the medium facing surface S. For this reason, the distance between the second upper magnetic pole layer 244b and a magnetic tape is larger than that between the first upper magnetic pole layer 244a and the magnetic tape, so that even if a leakage flux occurs between the second upper magnetic pole layer 244b and the first lower magnetic pole layer 42a or second lower magnetic pole layer 42b, the influence by this leakage flux can be suppressed.

Moreover, in the second embodiment, the width of the second upper magnetic pole layer 244b is made smaller than that of the second lower magnetic pole layer 42b and that of the first upper magnetic pole layer 244a. For this reason, it is possible to further suppress generation of a leakage flux between the second upper magnetic pole layer 244b and the first lower magnetic pole layer 42a or second lower magnetic pole layer 42b.

As described above, the preferred embodiments of the present invention have been described in detail, but the present invention is not limited to the above-described embodiments. For example, in the first and second embodiments the thin film magnetic heads 1, 2 concerning the present invention are applied to the magnetic head device 100 whose recording medium is a magnetic tape, however the thin film magnetic heads 1, 2 concerning the present invention may be applied to a magnetic head device whose recording medium is a hard disk.

Moreover, in the first and second embodiments, a planarizing process by CMP or the like is carried out to the entire wafer surface until the second lower magnetic pole layer 42b is exposed, however, for example, if the entire upper surface in the stacking direction of at least the second lower magnetic pole layer 42b can be exposed by partially removing the insulating layer 48, it is not necessary to carry out such planarizing process.

Moreover, in the first and second embodiments, the second lower magnetic pole layer 42b is completely covered with the insulating layer 48, however the concave portion 56 comprised of the second lower magnetic pole layer 42b and the insulating layer 48 may be formed by forming the insulating layer 48 so that the thickness thereof is equal to or less than that of the second lower magnetic pole layer 42b and then by carrying out a planarizing process, etching, or the like thereto.

Moreover, in the first embodiment the magnetic circuit is formed by the upper magnetic pole layer 44 comprised of the first to third upper magnetic pole layers 44a to 44c and the lower magnetic pole layer 42, and in the second embodiment the magnetic circuit is formed by the upper magnetic pole layer 244 comprised of the first to fourth upper magnetic pole layers 244a to 244d and the lower magnetic pole layer 42. The magnetic circuit may however be formed by an upper magnetic pole layer comprised of a single magnetic pole layer and the lower magnetic pole layer 42.

Moreover, in the second embodiment the second upper magnetic pole layer 244b is disposed apart from the medium facing surface S so as not to be exposed to the medium facing surface S, however the second upper magnetic pole layer 244b may be exposed to the medium facing surface S.

Moreover, in the second embodiment the second upper magnetic pole layer 244b is formed so that the width of the second upper magnetic pole layer 244b is smaller than that of the second lower magnetic pole layer 42b and that of the first upper magnetic pole layer 244a. However, the second upper magnetic pole layer 244b may be formed so that the width of the second upper magnetic pole layer 244b is larger than that of the first upper magnetic pole layer 244a and that of the second lower magnetic pole layer 42b.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A method of producing a thin film magnetic head, comprising the steps of:
   forming a first lower magnetic pole layer;
   forming a second lower magnetic pole layer in a part on the first lower magnetic pole layer;
   forming a nonmagnetic insulating layer on the first and second lower magnetic pole layers, the nonmagnetic insulating layer being less etched than the second lower magnetic pole layer;
   removing a part of the nonmagnetic insulating layer until an entire upper surface of the second lower magnetic pole layer in a stacking direction is exposed;
   forming a concave portion, that has a bottom portion and a side wall portion, by etching the second lower magnetic pole layer and the nonmagnetic insulating layer until a thickness of the second lower magnetic pole layer is thinner than that of the nonmagnetic insulating layer, thereby the bottom portion of the concave portion is configured by the second lower magnetic pole layer, the side wall portion of the concave portion is configured by the nonmagnetic insulating layer and a width of the second lower magnetic pole layer in a track width direction corresponds to a distance of the nonmagnetic insulating layer in the track width direction,
   forming a recording gap layer so as to cover at least a surface of the second lower magnetic pole layer and not to cover a whole surface of the side wall portion; and
   forming a first upper magnetic pole layer, whose width in the track width direction corresponds to the width of the second lower magnetic pole layer in the track width direction on the recording gap layer in the concave portion so as to fill the concave portion.

2. The method of producing a thin film magnetic head according to claim 1, further comprising the steps of:
   removing a portion that sticks out of the concave portion in the first upper magnetic pole layer after the step of forming the first upper magnetic pole layer; and
   forming a second upper magnetic pole layer that is connected to the first upper magnetic pole layer.

3. The method of producing a thin film magnetic head according to claim 2, wherein in the step of forming the second upper magnetic pole layer, the second upper magnetic pole layer is arranged at a position where the second upper magnetic pole layer is not exposed from a medium facing surface that faces a recording medium.

4. The method of producing a thin film magnetic head according to claim 2, wherein a width of the second upper magnetic pole layer in the track width direction is smaller than that of the first upper magnetic pole layer in the track width direction.

* * * * *